E. TIMMERHOFF.
STEERING WHEEL LOCK.
APPLICATION FILED DEC. 2, 1918.

1,297,038.

Patented Mar. 11, 1919.

INVENTOR
Ernest Timmerhoff
By Louis C. Vanderlip
Attorney.

UNITED STATES PATENT OFFICE.

ERNEST TIMMERHOFF, OF ELKHART, INDIANA.

STEERING-WHEEL LOCK.

1,297,038.  Specification of Letters Patent.  Patented Mar. 11, 1919.

Application filed December 2, 1918. Serial No. 264,941.

*To all whom it may concern:*

Be it known that I, ERNEST TIMMERHOFF, a citizen of the United States, and a resident of the city of Elkhart, county of Elkhart, Indiana, have invented certain new and useful Improvements in Steering-Wheel Locks, of which the following is a specification.

My invention relates to steering wheel locks for automobiles and the like.

The principal object of my invention is the provision of simple, effective and cheap means in steering mechanism to enable the disconnection of the steering wheel from the steering post. Other objects of my invention are mentioned and described herein.

Figure 1:
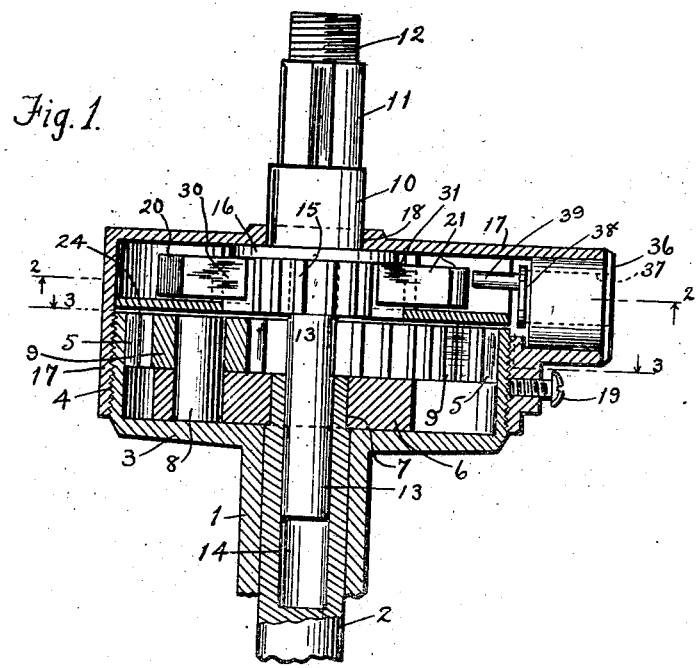
Figure 2:
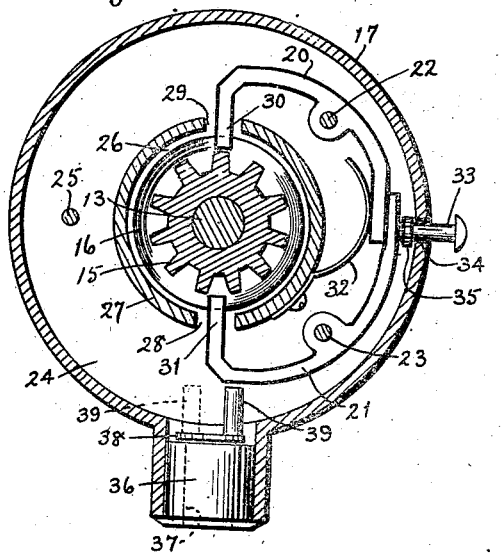
Figure 3:
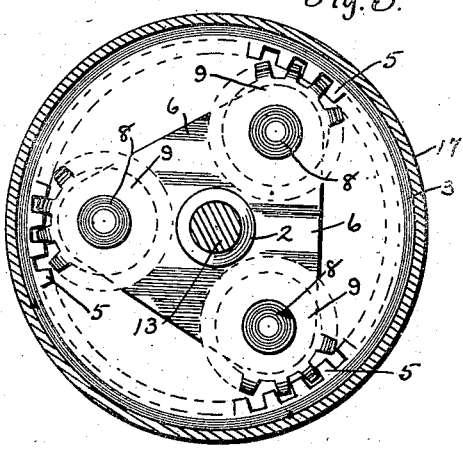

The preferred embodiment of my invention is illustrated in the accompanying drawing in which Figure 1 is a central vertical section through the steering head and the top end of the steering post, showing the steering wheel shaft gear disconnected from the steering post; Fig. 2 is a section taken on the line 2—2 of Fig. 1; and Fig. 3 is a section taken on the line 3—3 of Fig. 1.

Similar numerals of reference indicate like members and parts of members throughout the several views on the drawing.

A reference to the drawing discloses that the numeral 1 indicates the top end of the steering column of an automobile steering gear of the Ford type and within which the steering post 2 is arranged, the latter being connected with the front steering wheels of the car in the usual and well known manner. The numeral 3 indicates a housing member carried upon the upper end of the column 1 which housing is exteriorly threaded at 4 and formed interiorly with the endless rack 5. The numeral 6 indicates a pinion carrier and steering post driver member which is suitably apertured at 7 and rigidly fastened upon the upper end of the post 2, said carrier having three bearing pins 8 projecting upwardly therefrom at regular intervals, upon which bearing pins are revolubly mounted three pinions 9 meshing with the internal rack 5.

The numeral 10 indicates the steering wheel stud shaft which is provided with the bearing portion 11, adapted to receive the steering wheel, and the screw threaded portion 12 adapted to carry the nut—not shown—to engage above the steering wheel hub, as is well known in the art. The shaft 10 is reduced somewhat in diameter at its lower end 13 and slidably and revolubly arranged in the bore 14 formed in the upper end of the steering post 2, a driving gear or pinion 15 being rigidly mounted upon said shaft adjacent the upper end of said reduced portion. The numeral 16 indicates an annular collar rigidly mounted upon the shaft 10 above and in close proximity to the pinion 15 and somewhat larger in diameter than said pinion. The driving pinion 15 is adapted to simultaneously mesh with the three gears 9 which taken in combination with the rack 5 and the pinion carrier 6, form a planetary gear connection between the steering wheel shaft 10 and the steering post 2 for effecting a differential movement, as is well known in the art.

The numeral 17 indicates a housing cover member which is interiorly threaded to engage the screw threads 4 of the housing 3, said cover being centrally apertured at 18 through which aperture the shaft 10 projects to the cover exterior. Casual rotation of the cover 17 in its threaded connection with the housing may be prevented by the engagement of a set screw 19 which is operatively mounted in the wall of the housing 3. The gear 15 is normally adapted to mesh with the pinions 9 for operative connection with the car steering mechanism but may readily be demeshed from said pinions by upwardly sliding the wheel shaft 10 until the collar 16 engages the inner periphery of the cover 17, which position of said gear is clearly illustrated in Fig. 1 and in which position it may be detachably confined by the locking mechanism hereinafter described.

Numerals 20 and 21 indicate a pair of coöperating locking levers pivotally mounted within the cover 17 at 22 and 23, respectively, and above a carrier and partition member 24, the latter extending diametrically of and within said cover and above the gears 9, which carrier member may be supported by pins 22, 23 and 25 suitably connected with the upper wall of the cover 17. The carrier 24 is centrally apertured at 26 to permit of the upward movement of the gear 15 and the collar 16 which aperture is encompassed by an annular wall 27, said wall being apertured at 28 and 29 at substantially opposite points.

The levers 20 and 21 are provided with the inwardly extending points 30 and 31, respectively, which normally project through and are arranged in the wall apertures 28 and 29 and into the path of movement of the shaft collar 16, said lever points being yieldingly confined therein by a spring 32 which bears outwardly against the inner periphery of the outer end of lever 20, the latter being overlaid by the outer end of lever 21. The levers 20 and 21 are spaced from the wall 27 and the inner periphery of cover 17 to enable operative pivotal movement thereof. Numeral 33 indicates a button member slidably arranged within the aperture 34 of the cover 17 and provided with the head 35 at its inner end which head is arranged interiorly of the cover member and adjacent the overlapping ends of the levers 20 and 21 and against which the lever 21 may bear by virtue of the pressure of the spring 32. Obviously, when the button 33 is pressed inwardly the levers 20 and 21 are pivotally operated, whereby the lever points 30 and 31 are withdrawn from the path of movement of the gear collar 16.

When the gear 15 is in mesh with the gears 9 the lever points 30 and 31 serve as abutment members whereby casual movement of the shaft 10 upwardly is prevented. And when the gear 15 is demeshed, as indicated in Fig. 1, the lever points 30 and 31 engage beneath the collar 16 for detachably maintaining the demeshed relation with the gears 9.

Numeral 36 indicates a tumbler lock of any suitable type mounted in the cover 17 and provided with a revoluble key barrel 37 which is adapted to be rotated by a key—not shown—and having a disk 38 rigidly mounted upon the inner end of said key barrel. A cam or stop pin 39 is rigidly mounted eccentrically on the face of the disk 38 extending inwardly therefrom, which pin, by rotation of the key barrel 37, may be moved into or out of the path of pivotal movement of the lever 21 outwardly. Obviously, when the pin or cam pin 39 is positioned as indicated in Fig. 2—solid lines—the outward pivotal movement of both levers 20 and 21 by pressure upon the button 33 is impossible, and obviously, when said pin is positioned as indicated by the dotted lines thereof in Fig. 2, both of said levers are freely movable by pressure upon said button.

I claim:

1. In a steering head for an automobile the combination with a steering post immovable longitudinally, a housing mounted relatively to said post, a planetary gearing in said housing, of a stud shaft adapted to carry a steering wheel, a pinion fixed to said stud shaft said shaft being longitudinally movable relative to the steering post, whereby the said pinion may be moved into and out of mesh with the said planetary gearing, a collar on said shaft and movable therewith, a movable member mounted in said steering head and adapted to have its inner end normally arranged in the path of movement of said collar in the endwise movement of said shaft, lock controlled means for preventing movement of said movable member from the path of movement of said shaft collar, and means separate from said lock controlled means and operative from the exterior of the steering head for moving said movable member out of the path of movement of said shaft collar when said lock controlled means is disengaged.

2. In a steering mechanism for vehicles a steering head comprising a planetary gearing, an endwise shiftable stud shaft carrying a pinion forming a part of said gearing, a collar on said shaft and movable therewith, a pair of coöperating oscillatory members mounted in said head and adapted to have their inner ends normally arranged in the path of movement of said collar in the endwise movement of said shaft, lock controlled means for preventing oscillation of said oscillatory members from the path of movement of said shaft collar, and means for oscillating said oscillatory members out of the path of movement of said shaft collar when said lock controlled means is disengaged.

3. In a steering mechanism for vehicles a steering head comprising a casing, a planetary gearing, an endwise shiftable stud shaft carrying a pinion forming a part of said gearing, a collar on said shaft and movable therewith, a spring pressed oscillatory lever mounted in said steering head and adapted to have one end thereof normally arranged in the path of movement of said collar in the endwise movement of said shaft, a lock controlled member for preventing retractive oscillation of said lever, and means for retractively oscillating said lever when the lock controlled means is disengaged, said means comprising a member movably mounted adjacent said lever and extending to the exterior of the steering head casing.

In testimony whereof I have hereunto affixed my signature this 30th day of November, 1918.

ERNEST TIMMERHOFF.